United States Patent [19]

Iannacone

[11] 3,958,527

[45] May 25, 1976

[54] AUTOMATIC PRODUCT DEPLETION INDICATOR

[76] Inventor: Anthony Iannacone, 60 Watchung, Hawthorne, N.J. 07506

[22] Filed: Jan. 17, 1975

[21] Appl. No.: 541,880

[52] U.S. Cl. ............... 116/114 R; 116/DIG. 32; 177/45; 200/85 R; 340/272
[51] Int. Cl.² .................................. G01F 23/20
[58] Field of Search ............... 116/114 R, DIG. 32; 222/23, 41, 51; 73/296; 177/45; 340/272; 200/85 R, 61.2

[56] References Cited
UNITED STATES PATENTS

| | | | |
|---|---|---|---|
| 1,019,554 | 3/1912 | Taylor | 200/85 R |
| 2,841,108 | 7/1958 | Phillips | 116/114 R |
| 3,309,474 | 3/1967 | Heinrich | 200/85 R |
| 3,657,498 | 4/1972 | Heindorff | 200/85 R |

Primary Examiner—S. Clement Swisher
Assistant Examiner—Denis E. Corr
Attorney, Agent, or Firm—Sommers & Sommers

[57] ABSTRACT

The indicator of this invention comprises a product "empty" signal means actuated responsive to the product container achieving an empty condition, automatically actuating the empty signal means, to provide a visual empty signal, so that the user will be automatically signalled as to the need for replenishment when that occurs. The invention comprises a container movably received in a casing and normally urged to one (full) position responsive to balancing thereof on pressure means, and signal empty means positioned in the area of the container and interconnected with an intermediate mechanism activated on movement of the container, when empty, responsive to said pressure means. Prior to the container empty condition the pressure means will be inadequate to move the container to the point required to actuate the empty signal means.

6 Claims, 2 Drawing Figures

AUTOMATIC PRODUCT DEPLETION INDICATOR

BACKGROUND OF THE INVENTION

This invention generally relates to odor control units or active deodorant devices, air sanitizer units or devices, insecticide vapor units or spray devices, such as liquids, gels or solids, used to control or mask unpleasant odors by evaporating active materials, such as perfume substances, etc. evaporated into the ambient atmosphere, sanitize the air or treat the air with an insecticide. Means may be provided such as a small fan or blower, to work continually or intermittently through electric current or a battery power source, to aid dissipation of the evaporative materials. A difficulty in the use of such devices has been that the consumer did not have a rapid visual means for determining whether (and when) the container is empty. The invention enables a rapid determination to be made as to this by visually observing a container empty flag which will appear automatically only when the active substance has been expended to indicate that the unit is then essentially non-functional and that replenishment should be attended to.

There are, on the market, several devices, generally wall mounted units, intended to be serviced periodically; the drawback in use of such units is that they do not provide an indicator means when the container is empty or in need of servicing. The invention is designed to overcome these and other objections to devices in the prior art by building into the unit a small signalling means, such as a flag, to indicate the empty condition of the container when the active substance in the container has been expended and that it should be refilled to replaced by a new unit. The objectives of the invention may be achieved mechanically or electrically, by mounting the container in a casing suspended balanced on a spring exerting force which, when the container is full, equals the tare weight of the container plus normal contents. As the volatile liquid phase evaporates, the container becomes lighter and will move upwardly responsive to pressure exerted by means such as a spring (or other means) thereupon actuating a mechanism to position the empty signal flag in signalling position.

DESCRIPTION OF THE DRAWINGS

These and other objects of the invention are disclosed in the accompanying drawings wherein similar parts are similarly numbered and wherein.

DESCRIPTION OF A PREFERRED EMBODIMENT

Figure 1:
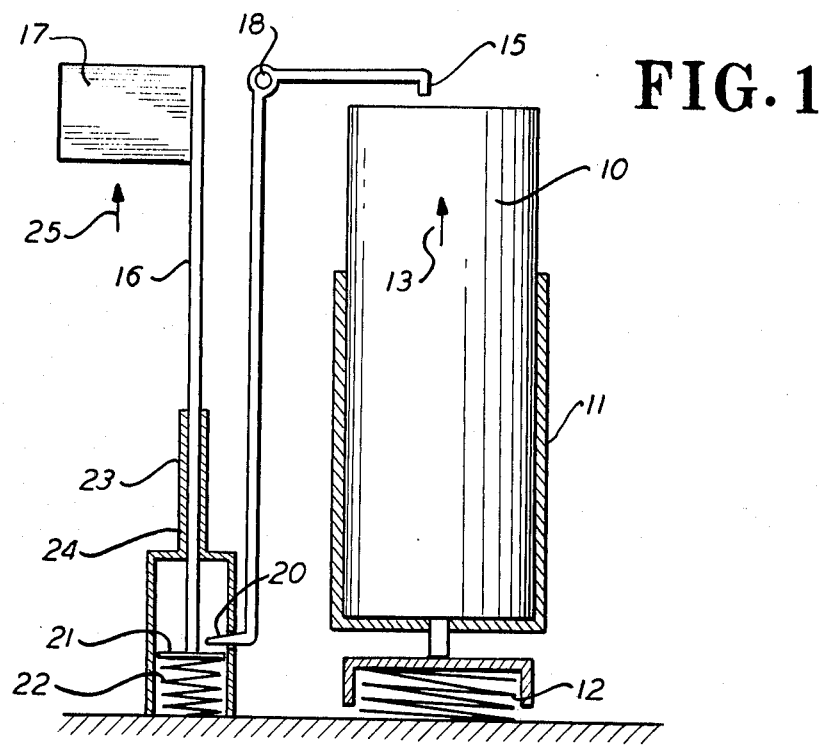
FIG. 1 is a vertical sectional elevational view of an automatic product depletion indicator embodying the invention.

As shown in the drawings the container 10, filled with an active liquid or gel, is axially movably positioned in a casing 11, which may be wall or otherwise mounted for movement of the container 10 in a direction 13 responsive to the means 12 on dissipation of the deodorant or other contents of the container. Contents may be dispensed by automatic periodic actuating of an aerosol spray valve; the contents may be otherwise periodically evaporated or volatilized or dissipated to the ambient atmosphere. The container is urged by spring or other means 12 to move in the direction 13 responsive to emptying of the container; the container, in its initially filled condition, will balance on the spring 12 so that the container will thus be positioned short of engagement with a means 15 for actuation of the container empty condition indicator device 16. The latter may be provided with a flag or other portion 17 to visually indicate the empty condition. The flag will remain in the FIG. 1 (retracted) position until the container 10 achieves the empty condition, whereupon the container will automatically move to actuate the means 15 which, (in FIG. 1) may be pivotally or otherwise mounted as at 18, on a suitable support (to which the casing 11 also may be mounted). The means 15 includes a nosing 20 for engagement with a latch portion 21 of the indicator rod 16 which is normally urged as by spring or other means 22 in the direction of arrow 25. The container empty indicator rod 16 may be axially slidably mounted in a tubular portion 23 of the housing 24 (also housing the spring 22). As will be noted from FIG. 1, when the container 10 moves to the empty condition (in the direction of the arrow 13) it will engage the means 15, thereby retracting the nosing 20 from engagement with the latch portion 21 of the rod 16, whereupon the rod will move axially as noted at 25.

Figure 2:
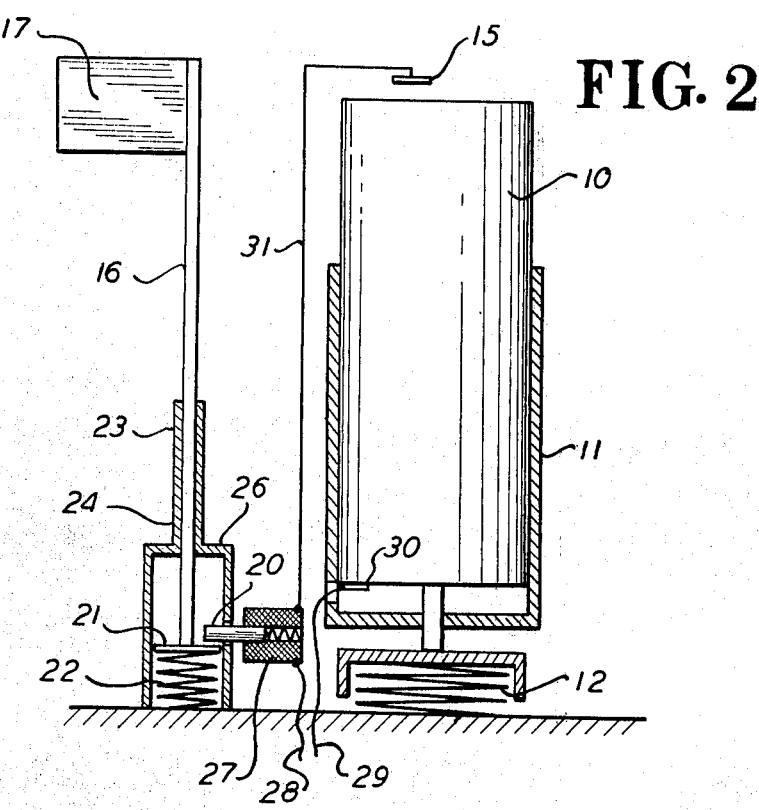
FIG. 2 is a similar view of a further form of the invention.

In the structure of FIG. 2 the parts correspondingly numbered correspond to those in FIG. 1. In the FIG. 2 form, the nosing 20, which normally holds the latch portion 21 of the container empty indicator rod 16 against movement responsive to the pressure of the spring 22, comprises the core or rod 20 of an electromagnet 27, which is actuated upon completion of its circuit through the wires 28, 29 connecting the electromagnet 27 to a power source and to which the container 10 is also connected, in an arrangement such that the circuit to energize the electromagnet is closed to retract the (core) nosing 20 to permit the empty flag to be moved to viewing position upon contact of the upper end of the container 10 with the means 15 which may be a wire 31 connected to the contact means 15 and to the electromagnet 27. The empty unit may be reset or replaced with a full or refilled container, the parts being restored to their normal position shown in the drawings by resetting the flag device to its normal "down" position with the nosing 20 thereof re-engaged with the latch portion 21 under pressure of spring 22.

The foregoing and other objects, features and advantages of the present invention will appear from a reading from the following description of the preferred embodiments of the invention taken in conjunction with the accompanying drawing and claims set forth below.

I claim:

1. A product empty signal means for indicating depletion of a product from a container reservoir and the need to replenish the same, comprisng:
    a. means movably receiving said container therein,
    b. means engaging the container and normally urging the same to a predetermined position relative to the container receiving means,
    c. empty signal actuating means positioned for actuation on movement of the container while normally clear of the container while the latter contains said product therein,
    d. said empty signal means including an elongated rod normally urged for movement in one direction, and
    e. means for normally holding the rod against movement in said one direction, and for releasing the rod for movement in said one direction on depletion of said container contents.

2. In a product depletion indicator as set forth in claim 1, said means so normally holding the signal member normally latching the rod.

3. In a product depletion indicator as set forth in claim 1, said means so normally holding the signal member comprising linkage means, normally latching the rod.

4. In a product depletion indicator as set forth in claim 1, said means so normally holding the signal member comprising electromagnetic means, normally latching the rod.

5. In a product depletion indicator as set forth in claim 1, said means so normally holding the signal member comprising pivotally mounted linkage means, normally latching the rod.

6. In a product depletion indicator as set forth in claim 1, said means so normally holding the rod comprising electromagnetic means actuated on contact of the container therewith on movement of the container to empty condition.

* * * * *